United States Patent [19]
Tuovinen et al.

[11] Patent Number: 5,543,128
[45] Date of Patent: Aug. 6, 1996

[54] REGENERATION METHOD FOR PROCESS WASTE CONTAINING SULFUR AND PHOSPHORUS

[75] Inventors: Heikki Tuovinen; Jorma Saari, both of Ulvila; Antti Roine, Vanha-Ulvila; Hannu Holma, Jarvenpaa; Matti Kalliokoski, Porvoo, all of Finland

[73] Assignee: Neste Oy, Espoo, Finland

[21] Appl. No.: 213,422

[22] Filed: Apr. 12, 1994

[51] Int. Cl.$^6$ .................................................. C01B 25/14
[52] U.S. Cl. ............................................................. 423/303
[58] Field of Search ............................... 423/303; 210/766

[56] References Cited

U.S. PATENT DOCUMENTS

| | | | |
|---|---|---|---|
| 3,183,062 | 5/1965 | Taylor | 23/206 |
| 3,800,028 | 3/1974 | Robota et al. | 423/303 |
| 4,374,706 | 2/1983 | Molla | 423/303 |
| 5,151,221 | 9/1992 | Österholm et al. | 252/500 |
| 5,198,202 | 3/1993 | Engel et al. | 423/303 |
| 5,219,492 | 6/1993 | Österholm et al. | 252/500 |

FOREIGN PATENT DOCUMENTS

| | | |
|---|---|---|
| 122058 | 9/1976 | Germany. |
| 1422501 | 1/1976 | United Kingdom. |
| WO90/09027 | 8/1990 | WIPO. |
| WO92/10352 | 6/1992 | WIPO. |
| WO92/14724 | 9/1992 | WIPO. |
| WO93/12106 | 6/1993 | WIPO. |

OTHER PUBLICATIONS

Ullmanns Encyklopädie der technischen Chemie, Band 18, pp. 369–371. (no date available).
Kirk–Othmer, vol. 17, pp. 501–504. (no date available).
Derwent Abstracts, JP–A–49–079372, Jul. 31, 1974.

Primary Examiner—Wayne A. Langel
Attorney, Agent, or Firm—Ronald J. Kubovcik

[57] ABSTRACT

A method for treatment of process waste obtained from the synthesis of thiophene or its derivatives, which method produces phosphorus pentasulfide of sufficiently high purity for recycling in said synthesis process, as well as a residue material suited for use as a raw material for fertilizers. In the treatment method, the process waste is subjected to vacuum evaporation in a combination heating/evaporation reactor at 500°–700° C. and under a partial vacuum of 0.01–0.2 atm. To improve the yield of the evaporating phosphorus pentasulfide, sulfur is added to the process waste. The evaporating phosphorus pentasulfide is condensed, and when desired, pulverized. The usable, phosphorus- and potassium-containing evaporation residue is removed from the reactor and cooled for further use.

10 Claims, 2 Drawing Sheets

REGENERATION METHOD FOR PROCESS WASTE CONTAINING SULFUR AND PHOSPHORUS

BACKGROUND OF THE INVENTION

1. Field of the Invention

The present invention relates to a method for the treatment of process waste resulting from the synthesis of thiophene compounds and their derivatives, which compounds are used in the manufacture of conducting polymers, said method providing phosphorus pentasulfide and a treatment residue suited for further utilization.

2. Description of the Prior Art

Sulfides of phosphorus are conventionally produced by heating elemental sulfur and phosphorus above their melting points and then cooling the process product. Phosphorus pentasulfide, referring to the compound having the formula $P_4S_{10}$, can be alternatively produced in a similar manner from sulfur and red phosphorus. Pure phosphorus pentasulfide is obtained by either using pure raw materials combined in an accurately determined sulfur-to-phosphorus ratio of the reactants, or, if the reactant materials are impure, through separate distillation of the reaction product from the heating of the sulfur and phosphorus. The reaction conditions of a manufacturing process for phosphorus sulfides can be determined from equilibrium curves. For further details refer to, e.g., such textbooks as Ullmann, Vol. 18, p. 369 and Kirk-Othmer, Vol. 17, p. 503.

Thiophenes or their derivatives can be employed in the manufacture of electrically conducting polymers according to patents granted to Neste Oy, refer to, e.g., U.S. Pat. Nos. 5,151,221 and 5,219,492 and WO 92/10352. To produce thiophene or its derivatives, a process has been proposed based on treating succinic anhydride or substituted succinic anhydride with a compound, containing sulfur and phosphorus. Such a manufacturing process gives large amounts of process waste, chiefly containing phosphorus, sulfur, potassium and oxygen, and further, minor amounts of carbon, hydrogen and sodium.

It is an object of the present invention to achieve a method for treatment of the above-described process waste that converts the waste into products suitable for further utilization. Because the process waste contains phosphorus and sulfur and because phosphorus pentasulfide is required in the manufacture of thiophene compounds, a person skilled in the art finds it logical to aim at producing particularly phosphorus pentasulfide from said waste.

SUMMARY OF THE INVENTION

According to the present invention a method is provided according to which phosphorus pentasulfide can be manufactured by evaporating sulfur- and phosphorus-containing process waste under vacuum or in an atmosphere of an inert carrier gas. The present method according to the present invention for treatment of process waste containing sulfur and phosphorus or compounds thereof is characterized in that preheated process waste, to which extra sulfur is added, is evaporated under vacuum and at a temperature of 500°–700° C., whereby the method combines the formation reaction of phosphorus pentasulfide with the purification of the phosphorus pentasulfide thus formed.

Such a single-step combination process of simultaneous formation and purification of phosphorus pentasulfide is an approach which is clearly different from prior-art processes and is advantageous in use particularly with respect to the fact that the initial reactant is an impure material containing different kinds of sulfur and phosphorus compounds. Greater inventive value to the present method is imparted by the lack of reliable thermodynamical data for such a reaction. Moreover, the evaporation carried out under vacuum makes it possible to recover a product from the evaporation residue that is suited for use as a raw material in the manufacture of artificial fertilizers. Obviously, such a method according to the present invention for treatment of a process waste achieves an almost waste-free end result, which in both economical and ecological terms must be considered an optimal approach.

DESCRIPTION OF PREFERRED EMBODIMENTS

Figure 1:
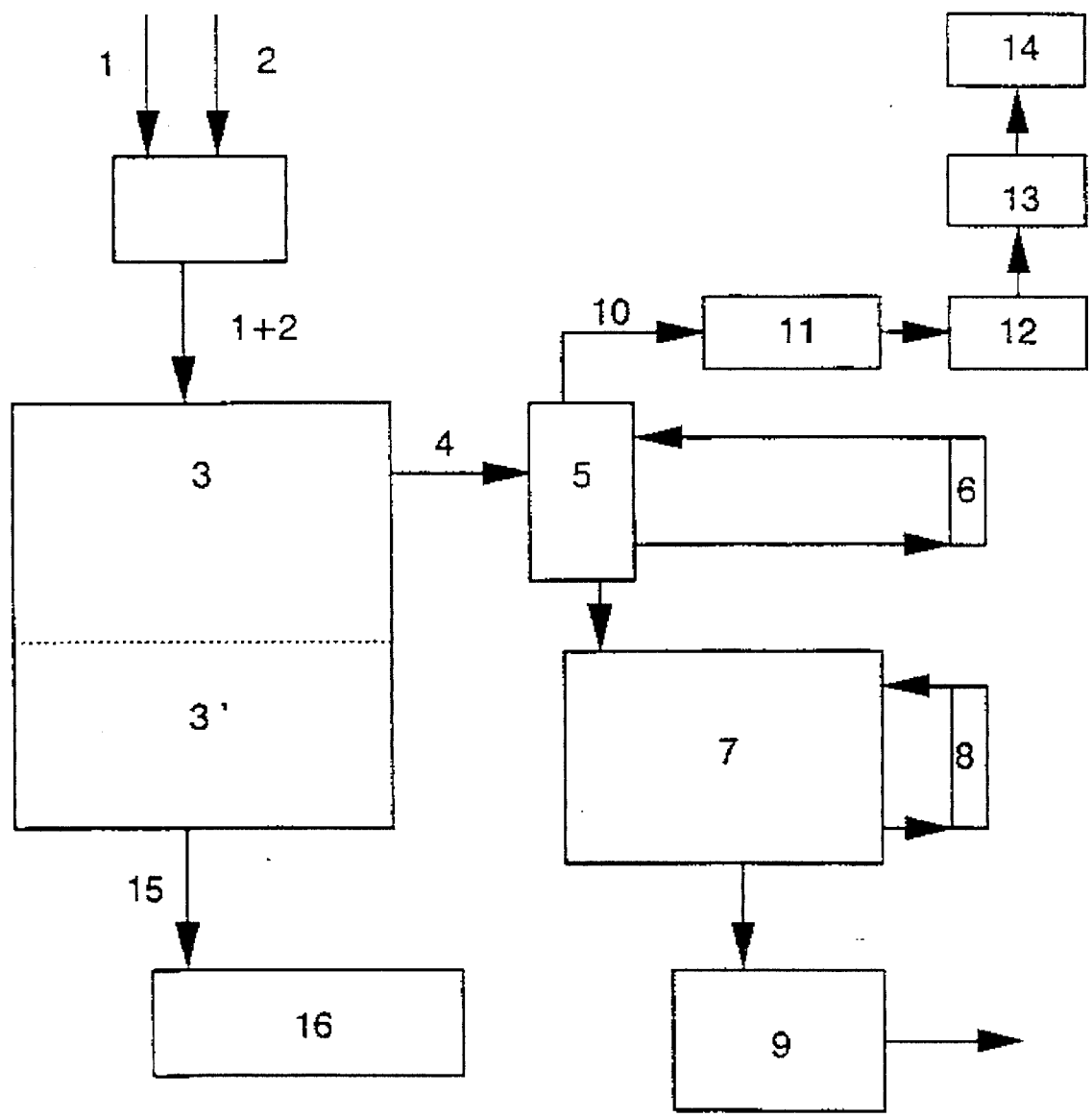
FIG. 1 is a schematic diagram of an entire industrial-scale regeneration plant of process waste.

As mentioned above, the manufacture of thiophene compounds produces large amounts of process waste, more precisely, approximately 5–6 times the amount of the primary product. The phosphorus and potassium occurring in the raw materials of the thiophene compounds manufacturing process are not transferred into the final product at all, but rather, remain entirely in the bulk of the process waste. The thiophene manufacturing process also incorporates the use of sulfur compounds from which sulfur appears in the waste. Further, the waste contains oxygen and minor amounts of carbon, hydrogen and sodium. Trace amounts of magnesium and iron have also been found in the waste. Heavy metals have not been detected. This is an advantage in regard to the usability of the evaporation residue obtained from the vacuum evaporation step as a raw material for fertilizers. According to structural analyses, the process residue contains phosphorus sulfides and oxides, as well as potassium phosphates and a certain amount of hydrocarbons. The elemental and structural analysis results are described in greater detail in the examples which follow.

According to the present invention, the above-described process waste is advantageously treated by evaporation under vacuum, whereby phosphorus pentasulfide is separated and condensed from the waste, and an evaporation residue is recovered that is usable as a raw material for fertilizers, said residue being chiefly potassium metaphosphate. To bring the stoichiometry of the phosphorus pentasulfide to be condensed as close as possible to the formula $P_4S_{10}$, sulfur must be added to the waste material feedstock. Experiments have shown approx. 0.25–0.40 wt-units of sulfur per 1 wt-unit waste material to be a suitable addition. Advantageously, the sulfur addition is 0.3–0.35 wt-units per 1 wt-unit waste material.

In the method according to the invention, the evaporation under vacuum is carried out in a combination heating/evaporation reactor. The batch is subjected in this reactor to heating up to 600°–800° C. to melt the process waste into a soft mass, while the actual evaporation is performed at 500°–700° C. under a partial vacuum of 0.01–0.2 atm. Advantageously, the evaporation is performed at a temperature of 540° to 570° C., preferably, 550° C. and under a partial vacuum of 0.05 to 0.09 atm, preferably, 0.07 atm. The evaporating phosphorus pentasulfide is condensed, after which the condensate can be subjected to pulverization and stored if so required. The evaporation also releases a certain amount of gases which are not recovered such as, e.g., hydrogen sulfide. Such stack gases are subjected to scrubbing and precipitation in a conventional manner. The usable evaporation residue remaining from the evaporation is removed from the reactor and cooled.

In an alternative embodiment of the method according to the present invention for treatment of process waste, the evaporation of the pentasulfide is performed at atmospheric pressure using an inert carrier gas, whereby the phosphorus pentasulfide is also formed in a single process step. The range of process conditions and the advantageous process conditions in this alternative implementation are identical to those employed in evaporation under a partial vacuum.

Reactor tests performed indicate that the phosphorus pentasulfide condensate recovered by means of the process waste treatment method according to the present invention is suitable for use as a raw material in the synthesis of thiophene compounds. According to sulfur and phosphorus analyses, the purity of the condensate exceeds 90% and is often better than 95%.

With a quantity approximately half of the amount of recovered condensate, the heating residue, or the evaporation residue, contains, inter alia, phosphorus and potassium as potassium metaphosphate, $KPO_3$. Almost all the potassium is water-soluble, and fortunately, only such water-soluble potassium is valuable in a raw material for fertilizer manufacture. The water-solubility of the phosphorus species is not sufficient as such, but its degree of solubility in water can be improved by additional processing. However, almost all phosphorus is soluble in ammonium citrate, which is advantageous for the further utilization of the residue. The remainder of the elements possibly contained in the residue are worthless in a raw material for fertilizer manufacture. Very low maximum values of heavy metal contents are permitted in fertilizers, and in fact, the heavy metal contents in the evaporation residue in the present case are virtually nonexistent.

The process waste treatment method according to the present invention achieves, as is evident from the above description, an extremely satisfactory end result in terms of both economics and environmental discharges. The process waste can be treated almost entirely to a usable form. Indeed, a major portion of the waste is converted to phosphorus pentasulfide of sufficiently high purity and thereby recycled back to the process proper which produces the waste, while the residue becomes a tradable raw material for fertilizer manufacturing. Waste which would cause environmental pollution and require treatment prior to dumping is not produced, and moreover, the raw material costs of the primary synthesis are reduced, while the sales of the fertilizer raw material fraction give additional income.

A more detailed elucidation of the method according to the invention is given by means of the examples and the drawings which are described below. However, these examples serve to illustrate the invention only and are not intended to limit the invention.

With reference to FIG. 1, in a regeneration plant of process waste the process waste 1 resulting from the manufacturing process of thiophenes and sulfur 2 added to the waste (0.25–0.40 wt-units per 1 wt-unit of waste) are passed as a feedstock mixture 1+2 into an evaporator reactor unit 3+3', where the batch is heated in section 3', while the actual vacuum evaporation occurs in section 3. In the heating section 3' the batch is heated up to 600°–800° C. in order to melt it into a soft mass, and the actual evaporation is then carried out at 500°–700° C. The evaporation occurs under a vacuum of 0.01–0.2 atm. The phosphorus pentasulfide gas 4 removed from reactor is condensed by cooling to 250° C. in a cooler 5, which is cooled by means of a heat exchanger 6. The sulfide, which is condensed to a solid state, can be finally subjected to pulverization 7 under an inert gas atmosphere circulating via a heat exchanger 8, and subsequently passed to a storage area 9, after which the phosphorus pentasulfide is ready for use in, e.g., the primary manufacturing process of the thiophenes. Gases 10 including hydrogen sulfide which are not suited for recovery are also removed from the condenser cooler 5. These gases are passed by means of a vacuum pump 11 into a post-combustion unit 12, after which the gases are subjected to scrubbing 13 and precipitation 14. At the end of the evaporation, in the evaporation reactor 3+3' there remains a nonevaporating residue 15 which is removed from the reactor and subjected to cooling 16, after which it can be shipped for use as a raw material for fertilizers.

EXAMPLE 1

Elemental and Structural Analyses of Process Waste

1a) Elements contained in the process waste were determined using different kinds of analytical methods. Phosphorus was determined by spectrophotometric measurement, potassium and sodium by means of an atom absorption spectrophotometer, and sulfur, carbon and hydrogen by means of LECO analyzers. The percentage of these elements in the process waste was as follows (percentages herein are in terms of weight unless otherwise described):

36% P, 35% S, 10% K, 17% O, 1.4% C, 0.3% H and 0.1% Na

In addition to these, the waste was found to contain 0.01% Fe and 0.05% Mg by emission spectrometry, while no traces of heavy metals could be detected.

1b) To determine the compounds contained in the waste (structural analysis), an x-ray diffraction (XRD) method was utilized. Some problems in this analytical method are caused by reactivity of the test material with moisture and the polymeric character of the material. By combining the percentages of elements obtained from the elemental analysis with the results from XRD, the following percentages could be computed for the compounds contained in the process waste:

45.5% $P_4S_7$, 13.7% $P_4S_x$, 29.3% $KPO_3$, 9.0% $P_2O_5$ and 1.6% $C_xH_y$.

Accordingly, approximately 60% of the compounds in the process waste are phosphorus sulfides, approximately 38% are compounds formed by potassium, phosphorus and oxygen, while the amount of hydrocarbons is approximately 1.6%.

Water-solubility tests indicate all of the potassium to be water-soluble, while the amount of water-soluble phosphate is dependent on the dissolution conditions.

EXAMPLE 2

Vacuum Evaporation in a Steel Cylinder Containing an Alumina Crucible

Figure 2:
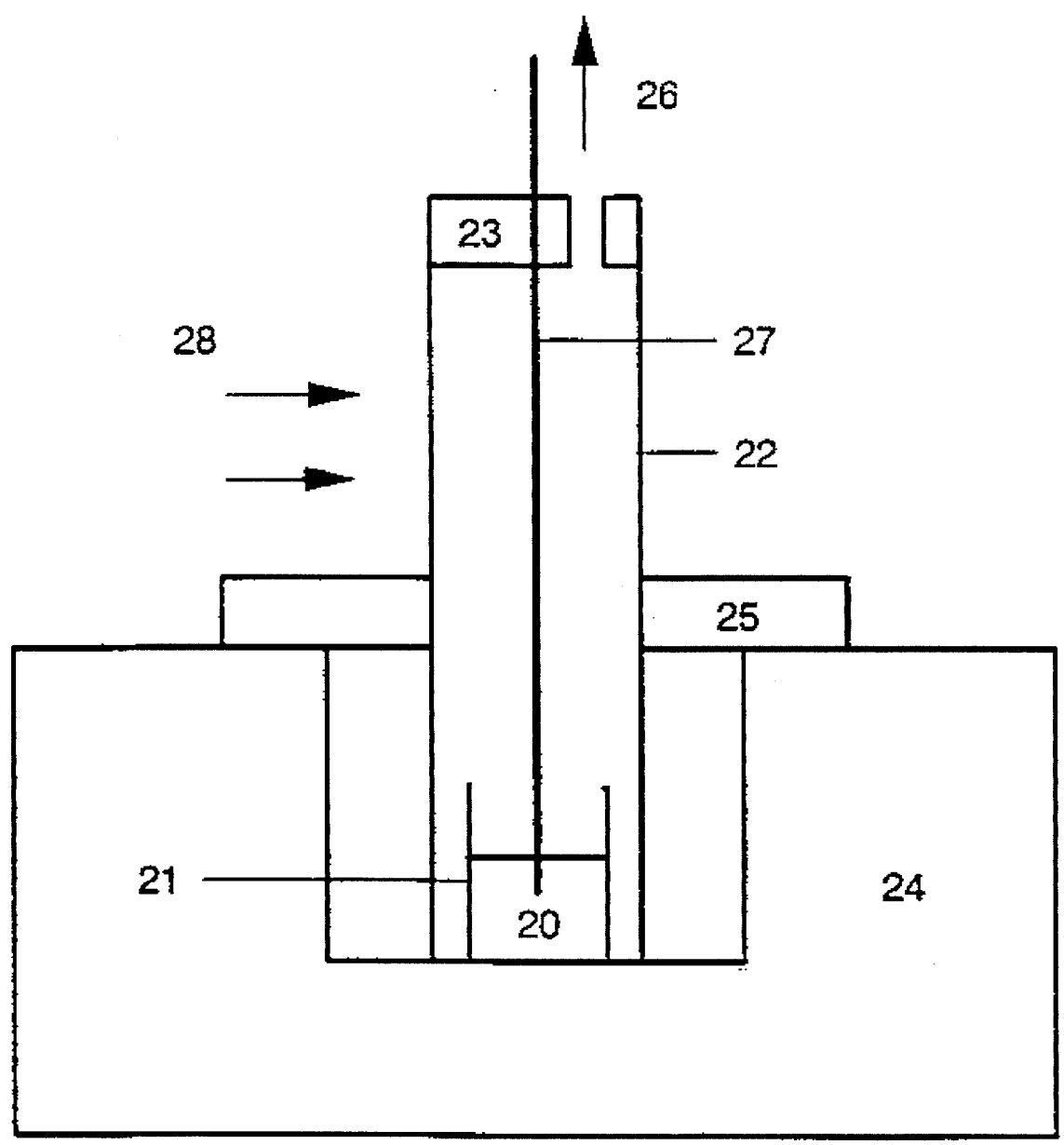
FIG. 2 is a laboratory-scale vacuum evaporator unit of process waste.

The vacuum evaporation in this example was performed in a vacuum evaporator unit as shown in FIG. 2. A batch 20 to be evaporated under vacuum, said batch containing 50 g process waste and 15 g sulfur (corresponding to a waste/ sulfur ratio of 1:0.3), was weighed into an alumina crucible 21 having a volume of 225 ml and resting on the inside bottom of a steel cylinder 22 with a height of 35 cm and a diameter of 8.5 cm. The cylinder 22 was stoppered with a rubber plug 23 and transferred to a crucible furnace 24. The upper part of the oven was provided with an insulation 25. A connection 26 was made through the rubber plug 23 via an intermediary bottle to a vacuum pump which is not shown in the drawing. The cylinder was pumped to a vacuum of 0.07 atm. The cylinder was provided with a heater element 27 with which the internal temperature was elevated to 550° C. where the batch was held for 1 hour. The temperature rate-of-rise was 250 K/h. The condensate formed thereby was collected at the cylinder upper end wall which was cooled by an air jet 28.

Subsequent to the cooling of the batch and opening of the cylinder, the evaporation step was found to conform to the plans except that a small portion (1.26 g) of the batch had foamed over the crucible rim onto the cylinder bottom.

After cooling the fractions were weighed and found to be as follows:

| Condensate | 36.96 g | (56.9%) |
| Evaporation residue | 22.16 g | (34.1%) |
| Total | 59.12 g | (91.0%) |
| Loss | 5.88 g | (9.0%) |

The overfoamed portion is included in the evaporation residue.

EXAMPLE 3

Elemental Analyses of the Condensate and Evaporation Residue

The fractions, that is, the condensate and the evaporation residue which were obtained by way of the vacuum evaporation according to Example 2 were subjected to elemental analysis of phosphorus, potassium, sulfur and carbon as follows:

After the dissolution of the test sample, phosphorus was determined by spectrophotometric measurement and potassium by atom absorption spectrophotometric measurement. Sulfur and carbon were determined by means of LECO IR-32H and LECO WR-12 analyzers.

The element contents and balances of the condensate and evaporation residue are given in Table 1 below.

TABLE 1

Element contents and balances of condensate and evaporation residue.

| CONTENTS | P [%] | K [%] | S [%] | C [%] |
| --- | --- | --- | --- | --- |
| Condensate | 30.3 | <0.05 | 69 | 0.13 |
| Evaporation residue | 27.3 | 22.5 | 6.4 | 0.93 |
| ELEMENTAL BALANCE | P [g] | K [g] | S [g] | C [g] |
| Condensate | 11.20 | <0.02 | 25.50 | 0.05 |
| Evaporation residue | 6.05 | 4.99 | 1.42 | 0.21 |

The phosphorus content of 30.3% and sulfur content of 69% in the condensate are not exactly the same as the percentages in perfectly pure $P_4S_{10}$, in which they are 27.9% phosphorus and 72.1% sulfur. However, the purity of the condensate is sufficient for use in the production of thiophene compounds. When a greater degree of purity is desired, the condensate can be recirculated via the evaporator unit.

EXAMPLE 4

Suitability of Evaporation Residue for use as Raw Material for Fertilizers

With reference to Table 1, the elemental analysis of the evaporation residue is given according to which the residue contains 27.3% phosphorus and 22.5% potassium, and in addition to these, 6.4% sulfur and 0.93% carbon. Besides these elements which are listed in Table 1, the evaporation residue contains approx. 42% oxygen and 0.2% sodium.

All of the potassium was found to be water-soluble, thus overcoming any difficulties in the recovery of potassium. Only this kind of water-soluble potassium is valuable in raw materials for fertilizers. However, the amount of water-soluble phosphorus was found to be only 11.4% of the total phosphorus. Fortunately, the solubility of the phosphorus in ammonium citrate was found to be extremely good, 99.6%. The water-solubility of the phosphorus can be improved by further processing to a sufficiently high value, namely up to 70%.

The heavy metal content (28 ppm Cu, 4.4 ppm Pb, 0.4 ppm Cd and less than 0.05 ppm Hg) does not exceed permitted levels.

Using x-ray diffraction analysis, the evaporation residue was found to contain certainly potassium metaphosphate, $KPO_3$, and probably $Na_2SO_3$ to some extent.

On the basis of the tests performed, the evaporation residue has been found to be suitable for use as a raw material for fertilizers.

What is claimed is:

1. A method for treating a process waste containing sulfur, phosphorus, potassium and oxygen to obtain phosphorus pentasulfide, comprising:

adding sulfur to said process waste to produce a mixture, evaporating said mixture under a partial vacuum of 0.01–0.2 atm and at a temperature of 500°–700° C. and condensing the vapor to obtain a condensate containing phosphorus pentasulfide.

2. The method of claim 1 wherein said mixture is preheated prior to the evaporating step.

3. The method of claim 1, wherein said process waste is obtained from a process for producing thiophene or its derivatives by the treatment of succinic anhydride or substituted succinic anhydride with a compound containing sulfur and phosphorus.

4. The method of claim 1, wherein the amount of sulfur added to said process waste is 0.25–0.40 wt.-unit per one wt.-unit of process waste.

5. The method of claim 4, wherein the amount of sulfur added to said process waste is about 0.3 wt.-unit per one unit of process waste.

6. The method of claim 1 or 4, wherein the vacuum evaporation is carried out at a partial vacuum of 0.05 to 0.09 atm and at a temperature of 540° to 570° C.

7. The method of claim 1 or 4, wherein the vacuum evaporation is carried out at about 0.07 atm partial vacuum and at a temperature of about 550° C.

8. The method of claim 1 or 4, wherein the purity of the phosphorus pentasulfide is at least 90%.

9. The method of claim 8, wherein the purity of the phosphorus pentasulfide exceeds 95%.

10. The method of claim 1 or 4, wherein following evaporation of the process waste a non-evaporated residue is obtained which contains mainly phosphates and sulfates of potassium and a minor amount of carbon.

\* \* \* \* \*